United States Patent Office 3,484,517
Patented Dec. 16, 1969

3,484,517
PIPE JOINT OF POLYURETHANE
Elmer R. Ligon and Thomas M. Medved, Pittsburg, Kans., assignors to W. S. Dickey Clay Manufacturing Company, Kansas City, Mo., a corporation of Delaware
No Drawing. Filed Dec. 23, 1966, Ser. No. 604,194
Int. Cl. B29h 9/00; C08g 22/08
U.S. Cl. 264—259
2 Claims

ABSTRACT OF THE DISCLOSURE

A casting polyurethane elastomer with improved properties is formed by producing a polyurea-polyurethane copolymer obtained from the use of non-hindered primary amine. The immediate reaction provides viscosity control.

BACKGROUND OF THE INVENTION

The invention relates to improved materials and methods for casting elastic joints in sections of vitrified clay pipe, and more particularly, to an organic polymer having substantially improved forming characteristics and physical properties for use in forming such pipe joints.

Heretofore, in-plant applied gaskets or sealing rings were usually composed of plasticized vinyl chloride polymer and, for some years, polyurethane elastomers have found favor as possessing certain advantages over the vinyl polymer. The polyurethane elastomers, however, exhibited several troublesome characteristics, for example, difficulties in controlling viscosity, mediocre tensile and tear strength, inability to closely control setup time, and poor resistance to tear propagation.

SUMMARY OF THE INVENTION

The principal objects of the present invention are: to provide an improved elastomer for use as a vitrified clay pipe coupling material; to provide such an elastomer which has the desirable characteristics of polyurethane elastomers with additional advantages; to provide such a material which permits better viscosity control and exhibits improved tear and tensile strength; to provide such an elastomer which has improved control of setup time so as to produce a non-slump material easily cast into molds; to provide such an elastomer which has improved tear propagation resistance; to provide such a coupling joint, calk and sealant material which has a highly desirable compressive modulus, low compression set, and load deformation resistance; to provide an improved method of making in-plant elastomeric sewer pipe joint structure; and to provide a joint material which is relatively economical to use and generally insensitive to chemical and microorganism attack as well as ambient conditions of temperature and humidity.

These objects are accomplished by obtaining an immediate chain extension reaction of a primary amine and an isocyanate. A non-hindered primary amine is used to confine viscosity and to form a copolymer of urea and urethane in which the urethane linkages can be obtained from any class of polyols.

Other objects and advantages of this invention will become apparent from the following description wherein is set forth by way of example certain embodiments of this invention.

DESCRIPTION OF THE PREFERRED EMBODIMENT

In accordance with this invention, it has been discovered that several advantages result from forming vitrified clay pipe joint structures from a polyurea-polyurethane copolymer. The copolymer comprises the resilient material which is the cured product of a reaction mixture of an organic polyisocyanate and a mixture of a polyalkylene ether glycol with an organic polyamine such as polyalkylene ether amine. The material is cured with a suitable low temperature curing catalyst, preferably, the organometallics commonly employed for this purpose. Suitable inert inorganic materials or combinations of materials may serve as a filler and acts as a reinforcing medium and a cost reducer.

By way of example, desirable low temperature curing polyurea-polyurethane copolymers for ceramic pipe joints may be formulated by combining the following parts:

Part A

53% by weight of a mixture of polypropylene ether glycol and polypropylene ether amine in a weight ratio ranging between about 99 to 1 and 2.3 to 1 and producing an equivalent weight of the mixture of approximately 1,000.

0.5% by weight of suitable pigment for color, such as iron oxide.

1.0% by weight of a suitable organometallic catalyst such as lead napthenate.

45.5% by weight of an inert filler such as kaolin.

Part B

100% of an organic polyisocyanate or a prepolymer made by reacting an organic polyisocyanate with an organic glycol to give an isocyanate terminated prepolymer.

The polyisocyanate or the isocyanate terminated prepolymer is selected with a suitable viscosity and weight percent of isocyanate to simplify metering ratios and pumping of the two parts. The respective parts A and B are mixed in the necessary ratio, in this instance, an NCO/OH ratio of 1.05 which produces a pourable liquid with a suitable pot-life for mold filling with rapid slump control. After a time lapse at room temperature aided by the exothermic reaction, the liquid changes into a tough elastomer having the characteristics pointed out above. A suitable biocide such as phenyl mercurial benzoate may be used, for example, in the amount of 0.3% by weight of the final mixture.

Although the exact sequence of reaction in the mixture is not known, it is assumed that the amine reacts with the isocyanate before the glycol forming a polyurea which is isocyanate terminated and in the glycol. The glycol then reacts with the isocyanate of the organic isocyanate and/or the polyurea isocyanate forming the polyurea-polyurethane copolymer elastomer.

In the above example, the typical physical properties obtained are: a compressive modulus of 1500 p.s.i. and Shore A-2 hardness of 75 while meeting the low compression set requirements of ASTM D395-55B, and excellent resistance to load deformation.

The selection of a primary diamine for the ether amine has been found to be preferable in providing an instantaneous reaction and exotherm which promotes the second stage reaction of OH and NCO. Further, a mixture containing polyalkylene ether glycol with primary hydroxyls has been found to desirably increase the reactivity of OH and NCO. A feature of this invention is the use of a non-hindered primary amine for producing an immediate reaction to confine viscosity and to form a copolymer of urea and urethane in which the urethane linkages can be obtained from any class of polyols. It is noted that this system requires a catalyst for the hydroxyl component in the mixture and various cure rates can be achieved by manipulating the catalyst and temperature.

Although certain forms of this invention have been described, it is not to be limited thereto except insofar as such limitations are included in the following claims.

What we claim and desire to secure by Letters Patent is:

1. In the provision of an elastomer for use in casting elastic couplings on vitrified clay pie, the method comprising:
   (a) combining about 53% by weight of polypropylene ether glycol and polypropylene ether amine in a weight ratio of between about 99 to 1 to about 2.3 to 1 forming an equivalent weight of the mixture of about 1,000,
   (b) adding to the mixture about .5% by weight of a pigment and about 1% by weight of an organometallic catalyst and about 45.5% by weight of an inert filler to form a combined mixture,
   (c) obtaining a material selected from the group comprising organic polyisocyanate and prepolymers formed by reacting organic polyisocyanate with an organic glycol to give an isocyanate terminated prepolymer, said material being characterized by a viscosity and weight percent of isocyanate to simplify metering ratios with said combined mixture,
   (d) mixing said material and combined mixture in a proportion wherein the NCO/OH ratio is about 1.05, whereby a pourable liquid is produced generating an exothermic reaction which rapidly produces slump control, and
   (e) casting said liquid against a pipe section prior to set up.

2. The method as set forth in claim 1 including:
   (a) a biocide addition.

References Cited

UNITED STATES PATENTS

| | | |
|---|---|---|
| 3,201,136 | 8/1965 | Harrison et al. |
| 3,250,538 | 5/1966 | Albon. |
| 2,929,800 | 3/1960 | Hill. |

ALLAN LIEBERMAN, Primary Examiner

U.S. Cl. X.R.

25—38; 260—37, 77.5; 264—267; 277—198